(12) United States Patent
Kleppe et al.

(10) Patent No.: US 9,435,992 B2
(45) Date of Patent: Sep. 6, 2016

(54) MICROSCOPE FOR WIDEFIELD MICROSCOPY (75) Inventors: Ingo Kleppe, Jena (DE); Daniel Schwedt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 256 days.

(21) Appl. No.: 14/344,704

(22) PCT Filed: Sep. 4, 2012

(86) PCT No.: PCT/EP2012/067176
§ 371 (c)(1),
(2), (4) Date: Mar. 13, 2014

(87) PCT Pub. No.: WO2013/045226
PCT Pub. Date: Apr. 4, 2013

(65) Prior Publication Data
US 2014/0347461 A1  Nov. 27, 2014

(30) Foreign Application Priority Data
Sep. 30, 2011  (DE) .......... 10 2011 083 847

(51) Int. Cl.
| H04N 7/18 | (2006.01) |
| G02B 21/36 | (2006.01) |
| G02B 21/06 | (2006.01) |
| G02B 21/16 | (2006.01) |
| G02B 26/00 | (2006.01) |

(52) U.S. Cl.
CPC ........... *G02B 21/361* (2013.01); *G02B 21/06* (2013.01); *G02B 21/16* (2013.01); *G02B 21/362* (2013.01); *G02B 21/365* (2013.01); *G02B 26/008* (2013.01)

(58) Field of Classification Search
CPC  G02B 21/361; G02B 21/362; G02B 21/365; G02B 26/008; G02B 21/16; G02B 21/06
USPC .......................................... 348/79
See application file for complete search history.

(56) References Cited

U.S. PATENT DOCUMENTS

| 6,309,078 B1 | 10/2001 | Dromaretsky |
| 2003/0137666 A1 | 7/2003 | Johnson |

(Continued)

FOREIGN PATENT DOCUMENTS

| DE | 39 15 421 A1 | 11/1990 |
| DE | 102 49 526 A1 | 5/2004 |

(Continued)

*Primary Examiner* — Allen Wong
(74) *Attorney, Agent, or Firm* — Patterson Thuente Pedersen, P.A.

(57) ABSTRACT

A microscope for widefield microscopy having a detection beam path and an illumination beam path. The microscope includes a filter wheel device, which is arranged in the detection beam path and/or illumination beam path and has a filter wheel, wherein the filter wheel is mounted to rotate about an axis, and wherein the filter wheel is divided into segments. Filters forming a first part-circle are arranged in a first part of the segments, such that said filters are consecutively introduced into the detection beam path or illumination beam path when the filter wheel is rotated. A camera records images at a predefined frequency. The filter wheel device includes a motor-driven shaft that rotates the filter wheel at a predefined rotation frequency. The microscope also comprises a control system for synchronizing the image-recording frequency and rotation frequency based on the filters arranged on the filter wheel.

19 Claims, 7 Drawing Sheets

(56) References Cited

U.S. PATENT DOCUMENTS

2006/0050146 A1* 3/2006 Richardson ............... G01J 3/10
348/80
2009/0147354 A1* 6/2009 Arbuckle ............... G02B 21/16
359/368

FOREIGN PATENT DOCUMENTS

| DE | 698 22 807 T2 | 1/2005 |
|---|---|---|
| DE | 10 2004 038 001 A1 | 4/2005 |
| DE | 10 2006 047911 A1 | 4/2008 |
| DE | 10 2007 047 466 A1 | 4/2009 |
| DE | 10 2008 054 317 A1 | 5/2010 |
| EP | 1 413 910 A1 | 4/2004 |
| EP | 1 655 598 A2 | 5/2006 |
| EP | 2 317 363 A2 | 5/2011 |
| JP | 10 206745 A | 8/1998 |
| WO | WO 96/37797 | 11/1996 |
| WO | WO 02/41064 A1 | 5/2002 |
| WO | WO 2008/028298 A1 | 3/2008 |

* cited by examiner

MICROSCOPE FOR WIDEFIELD MICROSCOPY

RELATED APPLICATIONS

The present application is a National Phase entry of PCT Application No. PCT/EP2012/067176, filed Sep. 4, 2012, which claims priority from DE Application No. 10 2011 083 847.3, filed Sep. 30, 2011, said applications being hereby fully incorporated herein by reference in their entirety.

FIELD OF THE INVENTION

The invention relates to a microscope for widefield microscopy, having a detection beam path and an illumination beam path. The microscope comprises a filter wheel device that is arranged in the detection beam path and/or illumination beam path and has at least one filter wheel, this at least one filter wheel being mounted so as to be rotatable about an axis, and said at least one filter wheel being divided into segments. Arranged at least in a first part of the segments are filters that together form a first divided circle, in such a way that they are successively introduced into the detection beam path or the illumination beam path when the filter wheel is rotated. The microscope further comprises at least one camera with a planar detector in the detection beam path. The camera may be a conventional digital camera or a planar detector with appropriate imaging optics. A suitable planar detector is, for example, a CCD or CMOS detector. The camera records, or is capable to record, images (also called frames) at a specified image acquisition rate (also called frame rate). The frame rate can be specified; as a rule, it is about 24 frames per second, but it may just as well be higher or lower, such as, for example, in a range between one frame per second and 30 frames per second.

DESCRIPTION OF THE INVENTION

For investigating live organisms, fluorescence microscopy has come to be the most important tool over the last decades. Apart from a variety of contrasting methods, this is also due, and especially so, to the possibility to label a specimen with many fluorophores at a time and to measure these fluorescent labels simultaneously. As a rule, this is done by spectral selection, which can be performed both on the excitation side, i.e. in the illumination beam path, and on the detection side, i.e. in the detection beam path, but also simultaneously in both beam paths. Preferred tools for observing such live specimens are laser scanning microscopes, because they permit relatively flexible and simple handling of spectral splitting both on the detection and the excitation side.

In widefield microscopy it is possible, on the one hand, to provide a certain flexibility on the illumination side by introducing varied light sources such as LEDs, lasers, etc. that can be switched on alternately or in combination. On the other hand, however, widefield microscopy is not particularly flexible on the detection side. This is due, in part, to the small number of detectors or cameras that are sensitive enough and can be integrated in a practicable way and with reasonable effort. Handling more than three cameras already takes a lot of effort. Another problem is that widefield microscopy does not scan a specimen point by point but supplies a total image of the specimen and, thus, the image information has to be split up spectrally. Optically, this is definitely more challenging compared to a dot scanner. Currently known standard solutions make use of a filter wheel that is indexed to the position appropriate for the respective recording. The filter wheel may consist of a diversity of filter components, such as, e.g., an excitation filter, a main dichroic beamsplitter and an emission filter. For parallel detection by several cameras, the filter wheel is used to effect spectral splitting of the image.

In prior art, various approaches are known to enable spectrally resolved detection with less design effort and a small number of detection channels. The two notable approaches are based on the use of liquid crystals and acousto-optical tunable filters (AOTFs).

Liquid crystals, while highly flexible, have extremely poor transmission. In addition, suppression of the light not wanted behind the filter only works by means of polarization. The use of AOTFs requires major intervention in the microscope's optical design; moreover, the image quality resulting from the necessary modulation of the AOTF is insufficient. As there is no collimated beam in detection, the use of AOTFs is limited to the field of view. Both methods, while having the advantage of relatively high flexibility in choosing filter bands, are far inferior to the classical filter with regard to their optical properties for imaging and suppression.

Classical filters are employed, too. As a rule, they are mounted in wheels and/or filter cubes, with excitation filters, dichroic beamsplitters and emission filters being combined. Due to the selection of appropriate filters with appropriate coatings and the selection of the angular spectrum, suppression is excellent and unequalled by other methods so far; color separation is optimum. Since, however, both the filter wheels and the known filter turrets in use have only few, i.e. about 6 to 10 positions available, the range of selection is limited to a few presettings. Moreover, filter change takes place relatively slowly; so-called multiband filters can be employed for special dye combinations, though, but not without compromises with regard to suppression and edge steepness in the transition zone between suppressed and transmitted wavelengths.

Classical methods for spectral separation consist in the use of gratings or prisms. Here, however, it is difficult to preserve the image information, because with prisms, e.g., the spectral resolution is not very high, whereas gratings entail a dependence on polarization and have other disadvantages regarding transmission.

Other methods known to be used are interferometric, in which each pixel is assigned a bit of spectral information. These methods perform but slowly, though, and can measure data in a sequential mode only. In addition, an interferometer is polarization-sensitive, difficult to adjust and liable to maladjustments.

In yet another method, known as unmixing, different dyes are separated by mere computation. It requires, however, as many channels to be detected as fluorophores are used for staining the specimens.

To sum up, none of the methods described above is capable, in widefield microscopy, of spectrally detecting a specimen flexibly with (a) sufficiently fast filter change and (b) high filtering quality.

The problem of the invention, therefore, is to overcome the disadvantages found in prior art and, in particular, improve a widefield microscope in such a way that it enables flexible spectral detection in widefield microscopy with a quality as high as that provided by the use of classical filters, so that a biological, possibly living specimen can be measured within a sufficiently short time before it gets bleached, e.g., if fluorophores are used.

In a microscope of the kind described above, this problem is solved in such a way that the filter wheel device comprises a motor-driven shaft on which the at least one filter wheel is mounted so as to be rotatable and which is designed to rotate at a specified rotational speed, and that the microscope comprises a control system for synchronizing the frame rate and the rotational frequency of the shaft, depending on the filters arranged on the at least one filter wheel.

In contrast to the conventional use of filter turret wheels, the arrangement of the at least one filter wheel on a shaft offers the advantage that, without much technical complexity, this can be driven by a motor at high rotational speeds permitting continuous, fast filter change. Obviously, the shaft and the at least one filter wheel arranged on it have to be arranged in the beam path in such a way that the filters arranged on the at least one filter wheel are hit by the light propagating in the illumination and/or detection beam path, but without obstructing the beam path otherwise. The control system links the rotational speed with the frame rate of the camera or the detector. It can control the frame rate as well as the rotational speed of the shaft.

In this way it is possible to ensure that the detection or illumination per frame recorded is performed only with specified filters or combinations of filters. In a particularly preferred embodiment, this synchronization of frame rate and rotational frequency causes never more than one filter of the first divided circle to be arranged in the detection beam path and/or illumination beam path per frame recorded. On the at least one filter wheel, diverse spectral functionalities, such as emission filters, beam splitters or emission filters, can be arranged to be introduced into the beam path in succession. Thanks to the arrangement on a rotating shaft, a high spectral flexibility can be achieved via time multiplexing, with the filter wheels or filter disks being able, in principle, to serve all filter functions needed in fluorescence microscopy. Because of the synchronization of frame rate and rotational frequency, the spectral illumination and detection properties of the microscope must be re-specified with every frame to be recorded, with frame recording being possible at high frame rates, i.e. at the common rates of about 24 frames per second.

In this way it is possible, e.g., to change, in between two frames, the dye-optimized spectral characteristics, so that, after the recording of a few frames corresponding to the number of dyes used, a completely unmixed image results, as, due to the system, each dye is excited separately. On the other hand, the specimen can be spectrally characterized completely via discretely varied spectral characteristics within several frames, e.g., within a second.

The filters may be applied, for example, as monolithic layers on a substrate serving as the filter wheel. Another possibility is to provide a filter wheel with suitable openings into which the filters can be inserted, either permanently or interchangeably; the latter makes for increased flexibility. Of course one can also interchange the complete filter wheels.

The space available on the filter disk can, in combination with suitably designed beam paths, be utilized in such a way that several filters on a filter wheel are used during a recording. For example, in at least a first part of the segments, filters forming at least one other divided circle are arranged, so that the segments of the first part are provided with at least two successive filters arranged in radial direction. The beam path then is, for example, designed in such a way that the same segment is hit by the light beam twice: once on a first, e.g. an outer divided circle, and the other time on another, e.g. an inner divided circle. It is of advantage to arrange on the outer divided circle the filter functions for such experiments that call for switching between a great number of filters such as, for example, emission fingerprinting or wavelength scans, since here the space available per segment is greater so that a coverage of beam cross sections can be achieved easier. On the inner divided circle one can arrange filters that, e.g., have to be changed less frequently; for example, one can arrange the filters alternatingly, with at least part of the filters being designed to cover two or more segments of the first part of segments, i.e. that various segments can be merged so that easier triggering can be achieved due to the larger filter surface. The rotational speed of the filter disk or alternatively the frame rate is adapted in such a way that, during the camera's exposure time, only one filter function per divided circle and segment in the beam path is active at a time. Obviously, the beam path can also be conceived in such a way that the outer divided circle is used only in detection, whereas the inner divided circle is only hit by illuminating light, or vice versa. It is also possible, of course, to use more than two divided circles, as especially the filter wheels and/or filters can be conceived to have varied diameters and sizes. Preferably, the at least one filter wheel is arranged near the pupil of the microscope's beam path, since this permits filter surface areas to be minimum, and since, e.g., slight maladaptations in synchronization or color gradients will not show up as artefacts in the image.

To enable several filters to be used in the same segment, the filter wheel device of the microscope preferably comprises means for deflecting light that was reflected by a first filter in one segment of the first part of segments, onto a second filter in the same segment. If more than two filters are arranged in a segment, the filter wheel device is provided with further means for deflection accordingly. Such means can also be used to bring about deflection onto filters in other segments or other filter wheels. The means for deflection can be implemented in various ways, with the possibility also to combine the various implementations.

As one possibility, the means for deflection comprise at least one mirror for deflecting the light that was reflected by one or several of the filters, onto another filter in the at least one filter wheel. The mirror can be arranged in a fixed position, but preferably it can be arranged so as to be shiftable along the beam path, which permits more possibilities for setting.

To efficiently suppress light reflected, for example, by the filters, it is expedient for the means for deflection to be provided with a number of closable diaphragms corresponding at least to the number of divided circles, which diaphragms may be arranged in front of or behind the filters. This is useful, for example, where several detection channels are employed, which then can be blocked individually. Corresponding to the number of detection channels, a number of detectors is provided. In another embodiment, therefore, the filter wheel device comprises at least one more mirror, which preferably is also shiftable along the beam path and which is arranged behind the at least one filter wheel in the beam path and designed to reflect the light onto another camera having a planar detector.

The means for deflection may further comprise a reflection prism that can be introduced into the beam path and serves to displace the incident beam before it hits the filter wheel. Thereby one can, for example, switch between different filter arrangements of a segment within the wheel. This can be used to advantage if the spectral characteristics of the filter areas overlap.

In another embodiment of the invention, between the segments of the first part there is arranged one segment each of a second part of segments, with the segments of the second part being reflective. The segments of the second part of segments that completely reflect the light used for detection can be used to particular advantage in connection with synchronization or triggering. Therefore, the filter wheel device comprises a light-sensitive detector, e.g., a photodetector, that is coupled to the control system and serves to detect light reflected by all filters of the filter wheel that are in the beam path at a time. For synchronization, i.e. for controlling the rotational frequency and/or the frame rate, the control system makes use of variations in intensity.

It is expedient for the filter wheel device to be provided with means for the coupling-in of Illuminating light.

In another embodiment, the means for deflection comprise a fully mirror-coated wheel, which is positioned on the shaft at a specified distance to the at least one filter wheel and is rigidly connected to the latter. Together with this it can be displaced on the shaft between specified positions; these positions can be implemented, e.g., as click-in positions, which can also be used for individual filter wheels not coupled with fully mirror-coated wheels. In particular, this can be employed for the coupling-in of illuminating light used to excite fluorophores.

In yet another embodiment, the filter wheel device comprises at least one second filter wheel, this at least one second filter wheel being rotatable against the first filter wheel and/or against the sense of rotation of the shaft, for the purpose of aligning the filters relative to each other. Further, also the shaft bearing the at least one filter wheel may be arranged to be displaceable normal to its axis of rotation, which provides further setting possibilities in that, for example, various filter wheels can be introduced into the beam path alternatingly without requiring reassembly. It is also possible to select between several divided circles arranged on the disk.

It is understood that the features mentioned before and those to be explained below, including the features mentioned in the claims, are applicable not only in the combinations stated but also in other combinations or as standalone features without leaving the scope of the present invention.

BRIEF DESCRIPTION OF THE DRAWINGS

Below, the invention will be explained in more detail with reference to the accompanying drawings, which also show features essential to the invention, among others, and in which.

DETAILED DESCRIPTION OF THE DRAWINGS

Figure 1A:
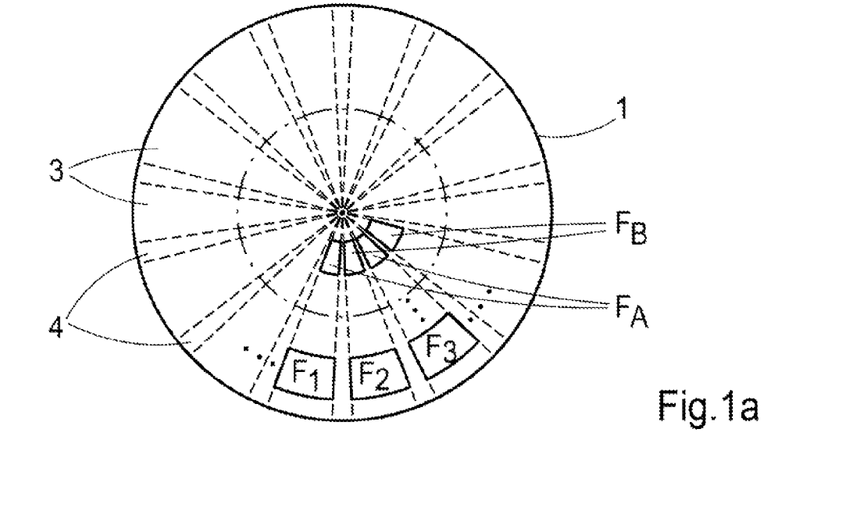
FIG. 1a and FIG. 1b show two possible embodiments of filters.
Figure 1B:
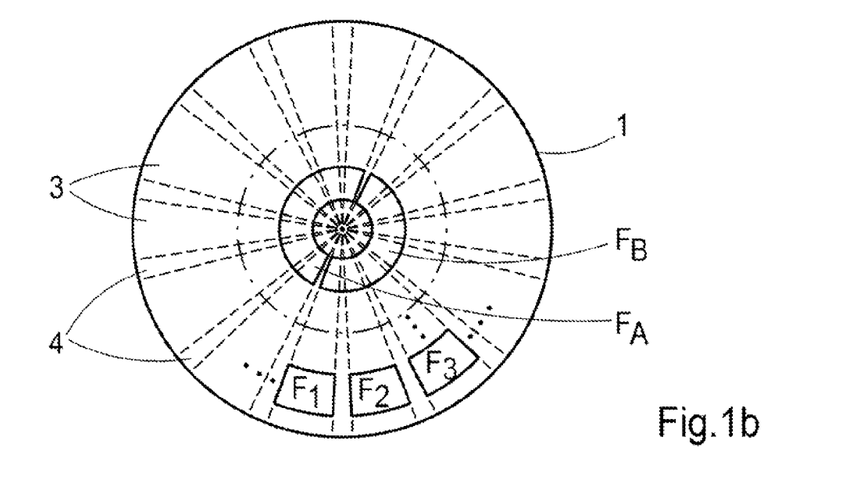

FIG. 1 shows two possible embodiments of filter wheels or filter disks. The filter wheel 1 shown in FIG. 1a and the filter wheel 2 shown in FIG. 1b differ in the arrangement of the filters on them. The filter wheel 1 shown in FIG. 1a is divided into segments. A first part 3 of segments is greater than a second part 4 of segments. On the first part 3 of segments, various filters $F_1$, $F_2$, $F_3$ and $F_A$, $F_B$ are arranged. Each of the segments of the first part 3 of segments is divided into two divided circles, an outer divided circle and an inner divided circle, which are separated by the dash-dot line. Thus, segments of the first part 3 of segments have at least two filters arranged successively in radial direction. Different combinations of frequently used filter functions varying in radial direction can be turned into the beam path. In principle, these can be designed to be any filter types for example, excitation filters, beam splitters or emission filters. On constant diameters of the outer, first divided circle and of the inner, second divided circle, then, there is a succession each of spectrally varied filter functions intended for the typical experiments.

Favorably, the areas of the second part 4 of segments are designed to reflect light; while this is not imperative, it is of advantage for the control system. To particular advantage, the filter wheels 1, 2 can be arranged close to the pupil of the microscope's beam path, as this permits the filter areas to be of minimum size and since slight maladaptations in synchronization and/or color gradients will not show up in the image as artefacts. On the outer, first divided circle of the filter wheel 1, the filter functions for such experiments can be arranged to advantage that require switching between a great number of filters $F_1$, $F_2$, $F_3$ etc., as e.g., emission fingerprinting or wavelength scans, since a larger area per segment is available here. It is thus easier to achieve coverage of beam cross sections. By contrast, the second divided circle switches alternatingly back and forth, e.g., only between very few filter functions, here between $F_A$ and $F_B$, with the added possibility as shown in FIG. 1b of merging several segments of the inner divided circle, to achieve easier triggering by means of a larger filter area. This is, of course, also applicable to the outer divided circle and to further divided circles possibly provided in other configurations.

The filter wheel is part of a filter wheel device arranged in the detection and/or illumination beam path of a microscope for widefield microscopy. The filter wheel 1, 2, of which the filter wheel device comprises at least one, is mounted so as to be rotatable about an axis extending in the figures normal to the sheet plane and through the circle center of the filter wheels 1, 2, for which purpose the filter wheel device comprises a motor-driven shaft rotating at a specified or specifiable speed. As the filter wheel 1, 2 is turned, the filters $F_1$, $F_2$, $F_3$ are successively introduced into the detection or illumination beam path. The same is true for the filters $F_A$, $F_B$ arranged on the second divided circle. However, the filters arranged on the same segment of the first part 3 of segments, e.g., $F_1$ and $F_A$ in FIG. 1a, are in the beam path at the same time. The filters may be monolithic coatings applied onto a substrate serving as a filter wheel, or they may be inserted into openings provided in the filter wheel and then are preferably interchangeable.

Connected to the microscope in its detection beam path there is at least one camera with a planar detector, the camera being designed to record frames at a specified frame rate. The microscope, then, is provided with a control system for synchronizing the frame rate and the rotational frequency depending on the filters $F_1$, $F_2$, $F_3$ and $F_A$, $F_B$ arranged on the at least one filter wheel 1, 2. Synchronization means that the rotational frequency of the shaft and thus, of the filter wheel 1, 2, is adapted to the camera's frame rate in such a way that, during the camera's exposure time, only one filter function per divided circle is active in the beam path at a time, i.e. that, for every frame recorded, not more than one filter of the first divided circle etc. is arranged in the detection beam path and/or in the illumination beam path. It is also feasible to adapt the frame rate to the rotational frequency, e.g., via triggering the shutter release, as described further below.

If a filter wheel has at least two divided circles, the filter wheel device also comprises means for deflecting light that was reflected by a first filter in a segment of the first part 3, onto a second filter in the same segment. These means for deflection will be explained in more detail with reference to the following drawings, viz. FIGS. 2 through 9, which show various embodiments of a filter wheel device.

Figure 2:
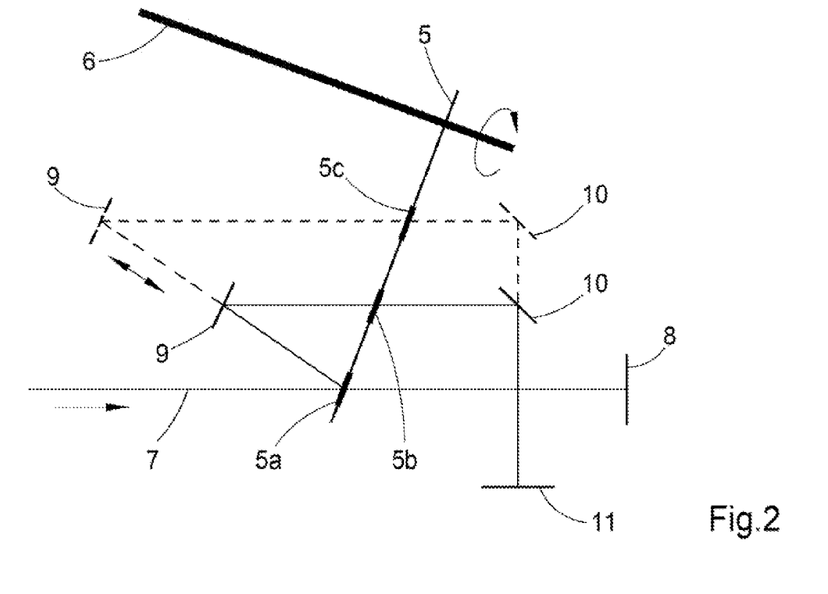
FIG. 2 shows a first embodiment of a filter wheel device with related beam path.

FIG. 2 shows a first embodiment of a filter wheel device. The filter wheel used here is designed as an emission filter disk 5 and comprises three divided circles; here, three filters 5a, 5b, 5c are shown in a segment of the first part 3 of segments. The emission filter disk 5 is arranged on a shaft 6 that rotates, driven by a motor. In this way, the device switches back and forth between different spectral transmission properties. The various radially arranged filter coatings are suggested in the drawing by the segments 5a, 5b and 5c. Detection light 7 coming from the specimen, e.g., fluorescent light, is first, in part, transmitted by the first filter area 5a towards a first camera 8, and, in part, reflected by the filter coating 5a, depending on its spectral properties. Reflected signal proportions are then directed, via a mirror 9 arranged to be displaceable accordingly along the beam path, onto another selectable divided circle and filtered there via the filter areas 5b or 5c, respectively. Depending on the position of the mirror 9, the light is deflected either onto filter coating 5b or onto filter coating 5c; the second case is indicated by the configuration drawn with broken lines. The filter wheel device further comprises at least one more mirror 10, arranged behind the emission filter disk 5 in the beam path and preferably displaceable along the beam path. This mirror receives the light transmitted by the second filter stage 5b or 5c and deflects it onto another camera 11, which is also provided with a planar detector. In this way, spectral multiplexing can be achieved on two detection channels simultaneously, which provides high spectral flexibility.

Figure 3A:
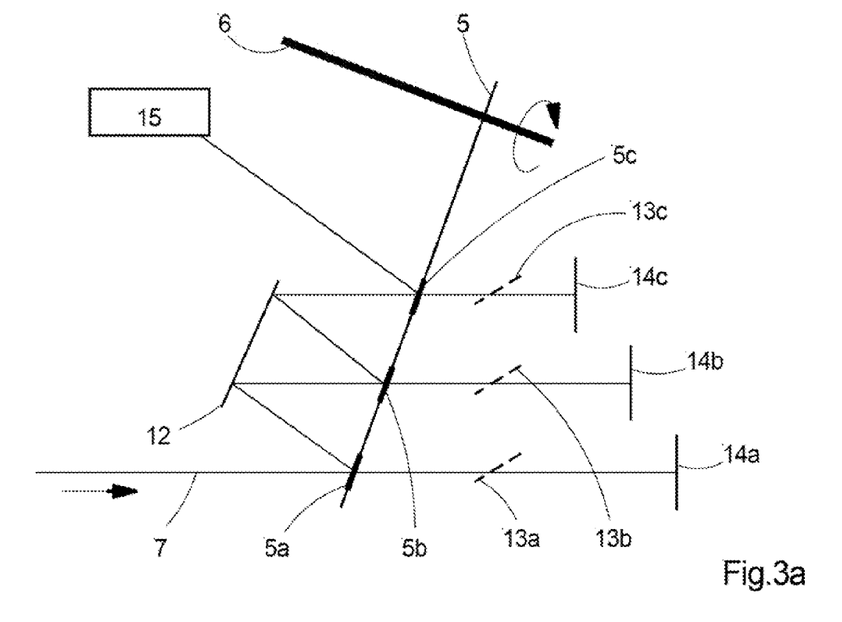
FIG. 3a and FIG. 3b show a second embodiment of a filter wheel device.
Figure 3B:
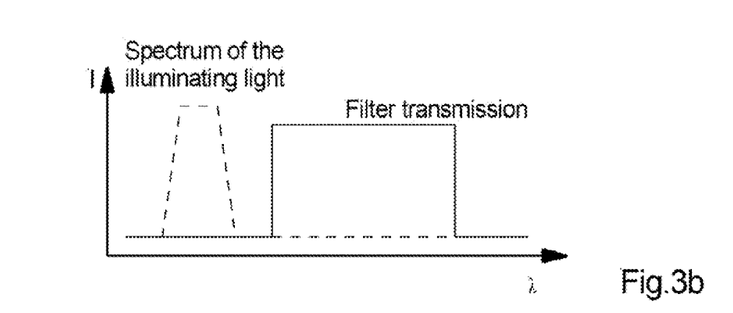

FIG. 3 shows an optical arrangement in which the filter wheel designed as an emission filter disk 5 is configured as shown in FIG. 2. Instead of the displaceable mirror 9, a fixed-position mirror 12 is used here, which deflects the detection light 7 originating from the specimen and reflected by the respective filter areas 5a, 5b, 5c, to the other radial filter positions of a segment of the first part 3 of segments, so that a greater number of detection channels is made available. Detection channels not needed are blocked by means of individual shutters, i.e. closable diaphragms 13a, 13b, 13c in front of the cameras 14a, 14b, 14c assigned to the respective detection channels. The geometry of the arrangement makes it possible, in addition, to couple in illuminating light from an illuminating light source 15 via the emission filter disk 5, because the reflective properties are opposite to the transmissive properties of the filter coatings 5a-5c, as shown in FIG. 3b. Unwanted transmitted excitation light will, thus, not reach the cameras 14a-14c.

Another arrangement is shown in FIG. 4. Here again, three cameras 14a, 14b and 14c are used, for example. By means of displaceable mirrors 16a and 16b, here displaceable in different directions of the beam path, the light reflected by the filter coatings 5a and 5b can be deflected. The areas of the first part 3 of segments not covered by filters, i.e. the areas between the filters, are designed to be completely reflecting, the term "completely" referring to the spectrum used. This means that the areas between the filter coatings 5a and 5b as well as 5b and 5c, and the area between the filter coating 5a and the rim of the emission filter disk 5 are completely reflecting. In the broken-line configuration of the mirrors 16a and 16b shown here, the illuminating light beam 7 that was reflected by filter coating 5a is first directed by mirror 16b onto an area between two filter coatings that is completely reflecting. After reflection off mirror 16b, the illuminating light is directed onto the filter coating 5c.

In addition, the arrangement shown comprises a reflection prism 17, which can be introduced into the beam path for displacing the incident beam of illuminating light 7. Unlike the simpler embodiment shown in FIG. 3, the arrangement shown in FIG. 4 can be employed to advantage especially if the spectral characteristics of the filter areas 5a-5c overlap. As a result, for example, three detection channels are made available here, each of which can be switched on and off separately.

Figure 4A:
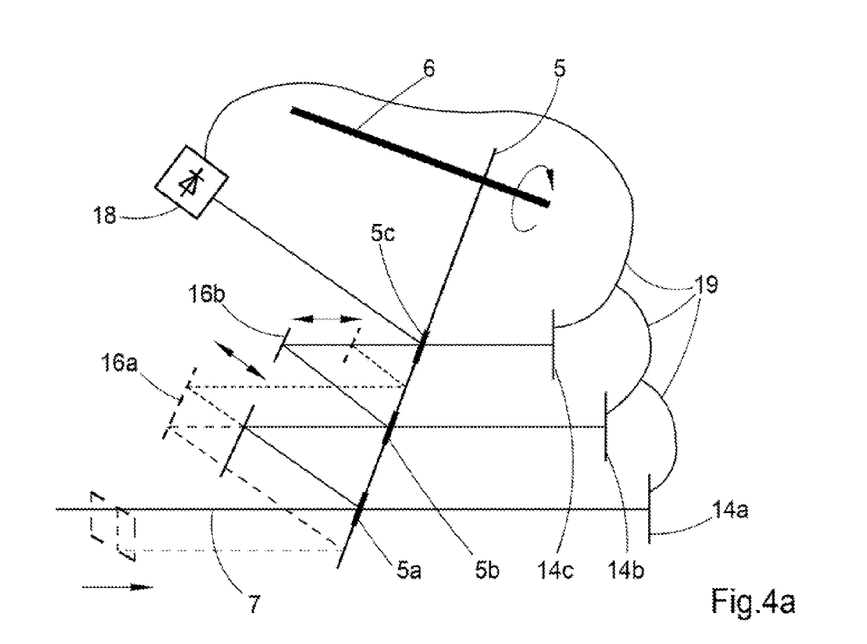
FIG. 4 shows a third embodiment of a filter wheel device.
Figure 4B:
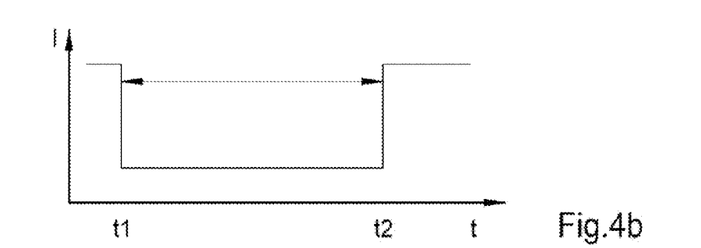

As an additional option, the arrangement shown in FIG. 4 is provided with a photodetector 18, which here detects the light that was reflected by all filter coatings of the filter wheel located in the beam path at a time. Since, as a rule, only part of the light is reflected by the filter areas, and since those areas of the second part 4 of the segments which face the photodetector are designed to reflect the spectrum completely, the output signal can be used for triggering or synchronizing the cameras 14a-14c, because the light intensity incident on the photodetector 18 is maximum if the segments of the second part 4 of the segments are in the beam path and all the light is reflected. The cameras, then, have to be activated between the falling and the rising edge. The photodetector is coupled to the control system, which uses the variations in intensity to control the frame rate. That is, the frame rate is synchronized with the rotational frequency; the length of the times between frame recordings can also be controlled in this way. This is symbolized by control leads 19 in FIG. 4a. FIG. 4b shows an example of triggering a frame recording as a function of the intensity I versus the time t. At a time t1, the intensity I registered by the photodetector 18 suddenly drops, which means that light is transmitted by at least one of the filter coatings 5a-5c. The planar detectors of the cameras 14a-14c are then switched to recording. When time t2 is reached, the intensity registered rises again, which means that the illuminating light 7 is completely reflected again. Recording is then stopped.

The photodetector 18 can be used not only in the arrangement shown in FIG. 4 but also in the arrangements described above and those shown in the following drawings.

Figure 5:
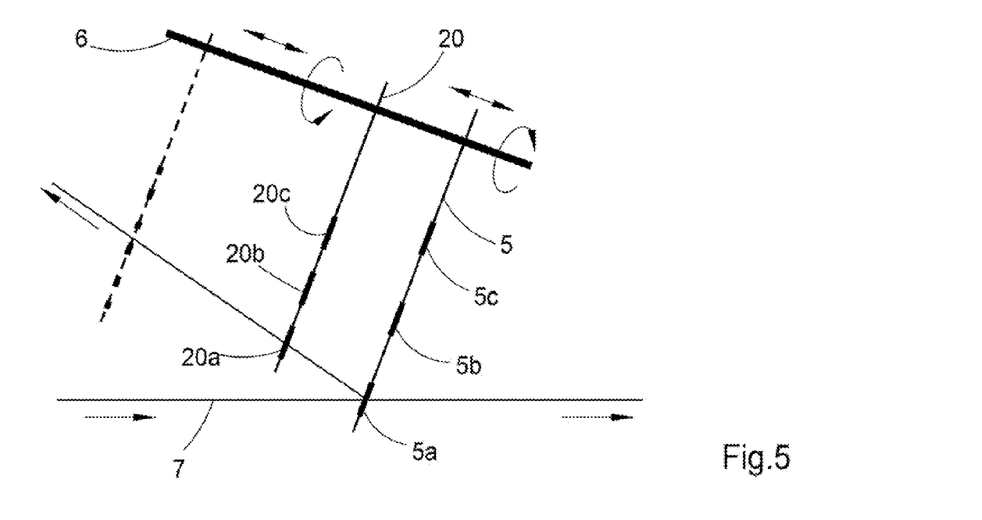
FIG. 5 shows a fourth embodiment of a filter wheel device.

FIG. 5 shows another arrangement, in which, in addition to the emission filter disk 5, another emission filter disk 20 with filter coatings 20a, 20b and 20c is arranged on the shaft 6. The filter coatings provided on this disk may vary. To activate different radial positions on the filter disks, the filter disks 5 and 20 are placed in different predefined positions on the rotating shaft, in such a way that, in order to align the filters with each other, either the one filter disk 5 or the other filter disk 20 or both filter disks are displaceable on the shaft relative to the other filter wheel. In other words, the disks can be changeably placed in different predefined positions, which are preferably click-in positions. Other ways of position fixing are also feasible, such as, e.g., magnetic clutches. Placement change, indicated in FIG. 5 by the double-head arrow between the solid-line and the broken-line position of filter disk 20, can be effected both manually and automatically. To match the succession of transmission characteristics, it is of advantage if one of the two filter disks 5 or 20 can be turned in a direction opposite to the sense of shaft rotation, possibly with the filter disk clicking into positions predefined by the segmentation, followed by a possible rotary displacement in the sense of shaft rotation, indicated here by the curved arrow pointing in clockwise direction.

Figure 6:
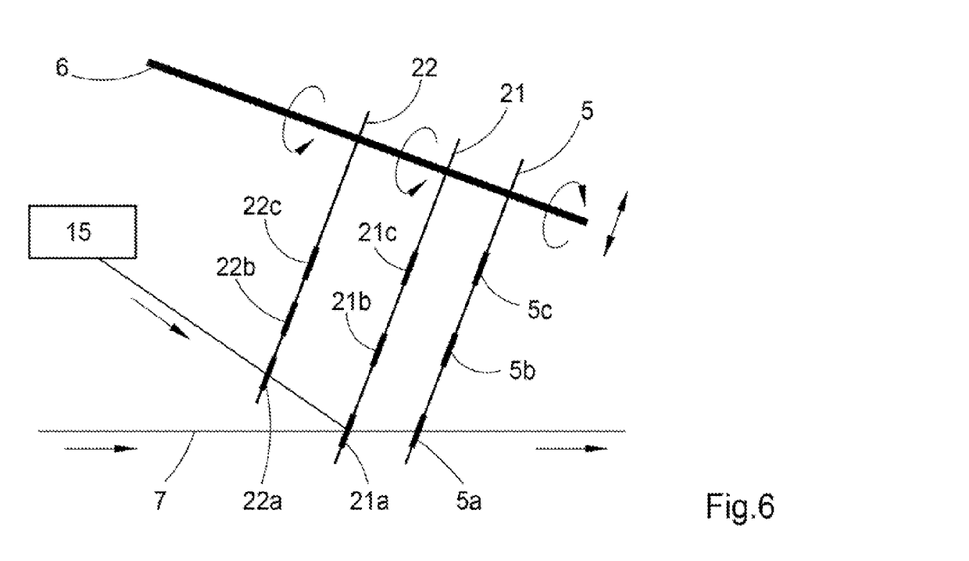
FIG. 6 shows a fifth embodiment of a filter wheel device.

In another arrangement, shown in FIG. 6, three different filter disks 5, 21 and 22 are arranged on the rotating, motor-driven shaft 6. In addition to the emission filter disk 5, the shaft is provided with a beam divider disk 21 with appropriate filter areas 21a-21c and an excitation filter disk 22 with excitation filters 22a-22c. The excitation filter disk 22 and the beam divider disk 21 are arranged on the shaft so as to be separately rotatable in a sense opposite to the sense of shaft rotation and to click into fixed angular positions, so that correct angular orientation of the disks is ensured. In this arrangement, switching between different divided circles is effected by displacing the entire shaft 6 normal to its rotation axis along the radius of the filter disks, in the plane generated by the shaft 6 and the detection light beam 7; this means that the shaft 6 is mounted so as to be displaceable in this direction. In this way it is possible to couple light from the illuminating light source 15 into the microscope's beam path by reflection of the illuminating light off the filter areas 21a-21c of the beam divider filter disk 21. Before this, the excitation light is filtered accordingly when passing the filter areas 22a-22c of the excitation filter disk 22. Fluorescent light emitted by the specimen, which constitutes the detection light 7 in the detection light beam, is freed from residual excitation light by the filter areas 5a-5c of the emission filter disk 5 and passed on towards the cameras, which are not shown here.

Figure 7:
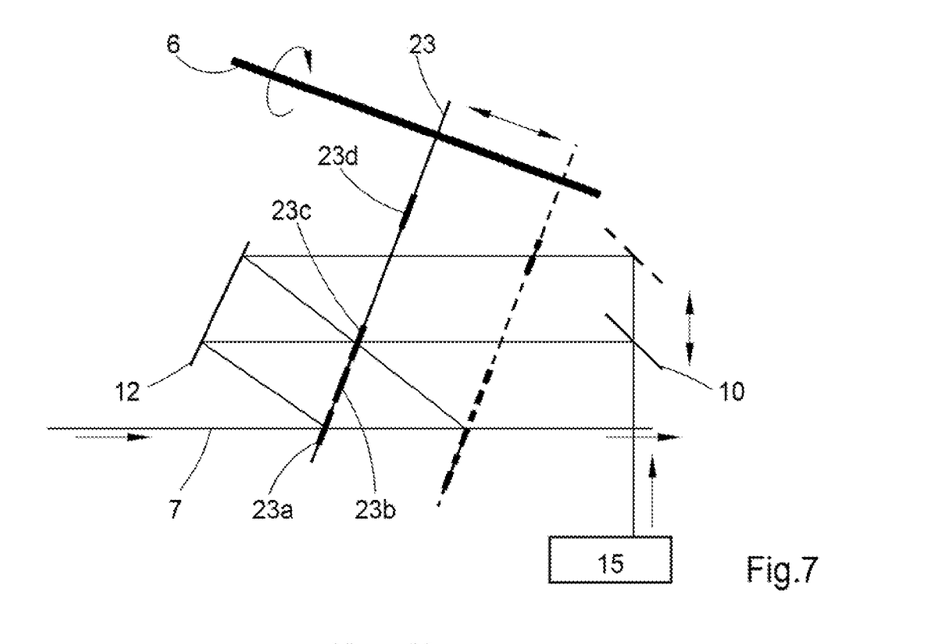
FIG. 7 shows a sixth embodiment of a filter wheel device.

FIG. 7 outlines an optical arrangement in which a filter wheel designed as a multifunctional filter disk 23 is arranged on the rotating shaft 6. The filter disk 23 can be placed in different specified positions on the shaft, and it can click into these positions. In this way it is possible that detection light 7 originating from the specimen, e.g., fluorescent light, can be treated with different filter areas 23a and 23b before it is passed on towards a detector, indicated by the arrow pointing right. The filter areas 23a and 23b serve as beam splitting filters, which reflect the illuminating light used for excitation from the illuminating light source 15 into the microscope's beam path. The inner two of the altogether four divided circles of the filter disk 23 are provided with excitation filters 23c and 23d, through which the excitation light passes before it is reflected in by a fixed mirror 12 and the beam divider filter areas 23a and 23b. The beam offsets resulting from the displacement of the filter disk 23 are compensated by an adjustable mirror 10.

Figure 8:
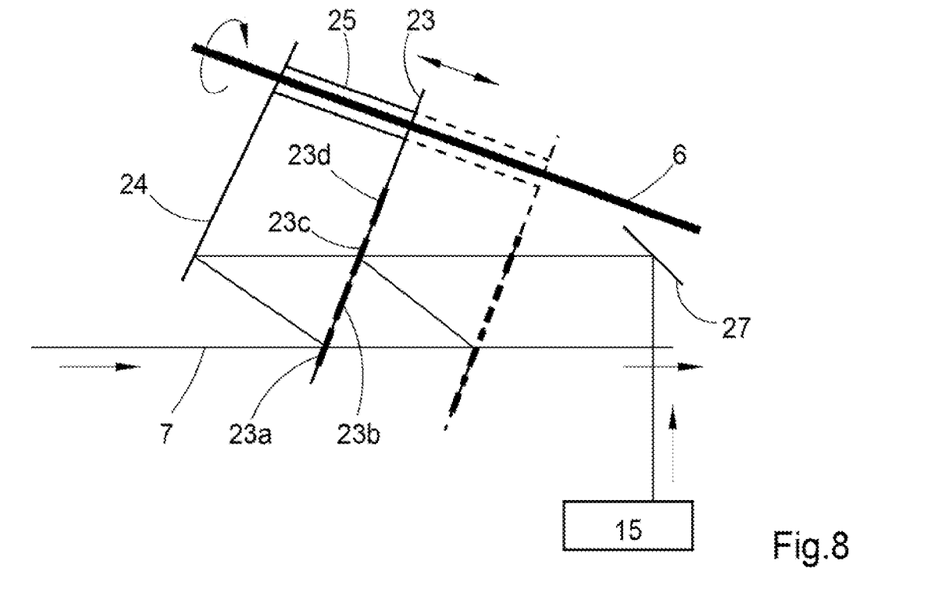
FIG. 8 shows a seventh embodiment of a filter wheel device.

In FIG. 8, the multifunctional filter disk 23 is arranged on the shaft 6 together with a fully mirror-coated wheel 24. Both are positioned at a specified distance from each other, rigidly connected to each other, and can be displaced together on the shaft 6 between specified positions. Both disks 23 and 24 can be clicked into predefined positions on the shaft 6 together. This avoids beam offsets that might occur if the filter disk 23 is displaced alone. Thus, excitation light of the illuminating light source 15 can first be deflected by the mirror 10 towards the selected excitation filter areas 23c and 23d. The fully mirror-coated wheel 24 then deflects the excitation light to the selected beam divider filter areas 23a and 23b, which reflect the illuminating light into the microscope's beam path. Fluorescent light emitted by the specimen, i.e. the detection light 7, is directed through the beam divider filter areas 23a and 23b and towards a detector arranged on the right outside the drawing sheet. If the spaces between the filter areas 23a-23d are fully mirror-coated, the specimen will not be illuminated during the short times in which the camera does not take frames, which will reduce bleaching.

Figure 9:
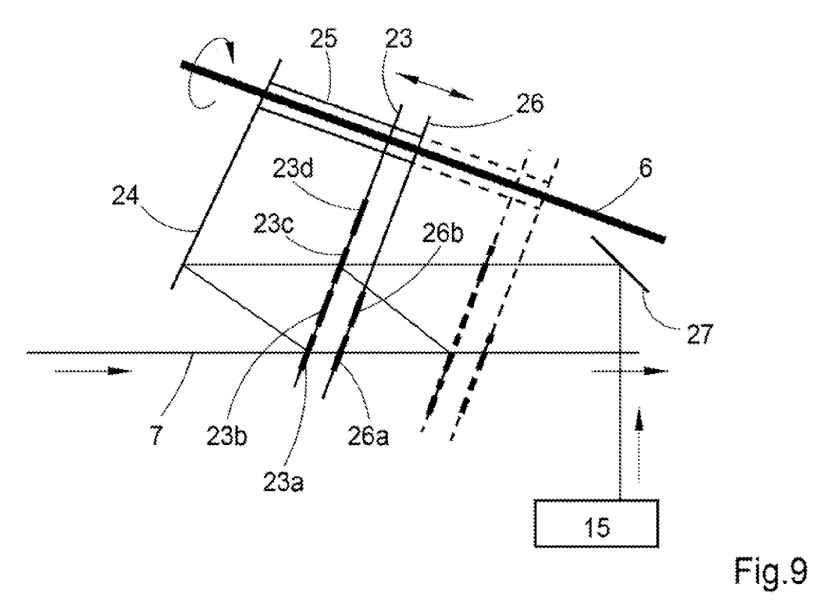
FIG. 9 shows an eighth embodiment of a filter wheel device.

FIG. 9 shows an embodiment similar to the one shown in FIG. 8. Here, the multifunctional filter disk 23 is, in addition, rigidly connected with an emission filter disk 26, so that all three disks can be displaced to predefined positions together to activate appropriately selected filter areas. The light of the illuminating light source 15 is directed onto the preselected emission filter 23c or 23d of the multifunctional filter disk 23 by means of a fixed mirror 27. After, the fully mirror-coated wheel 24 deflects the filtered excitation light onto the suitably selected beam divider filter 23a or 23b, which couples the excitation light into the microscope's beam path. Detection light 7 coming from the specimen is first transmitted by the beam divider filter 23a or 23b on the multifunctional filter disk 23, subsequently freed from residual excitation light by a suitably selected emission filter 26a or 26b of the emission filter disk 26, and passed on towards the detector on the right. In this arrangement, the inner divided circles of the emission filter disk 26 are provided with reflection-suppressing coatings, as they should pass the excitation light as free from reflections as possible.

What is claimed is:

1. A microscope for widefield microscopy with a detection beam path and an illumination beam path, comprising:
    a filter wheel device including at least one filter wheel mounted on a motor-driven shaft so as to be rotatable about an axis at a specified rotational frequency, the at least one filter wheel arranged in the detection beam path, or in the detection beam path and the illumination beam path, the at least one filter wheel being divided into a plurality of segments, a first plurality of filters forming a first divided circle being arranged in at least a first part of the segments, so that each filter in the first plurality of filters is successively introduced into the detection beam path or the illumination beam path when the filter wheel is rotated, and a second plurality of filters forming at least one more divided circle, arranged in at least the first part of the segments, so that the segments of the first part contain at least two filters arranged in succession in a radial direction, the filter wheel device further comprising means for deflecting light reflected by a first filter in a segment of the first part of segments onto a second filter in the same segment;
    at least one camera with a planar detector in the detection beam path, designed to record images at a specified frame rate; and
    a control system for synchronizing the frame rate and the rotational frequency depending on the filters arranged on the at least one filter wheel.

2. The microscope of claim 1, wherein, due to the synchronization of frame rate and rotational frequency, not more than one filter of the first divided circle per recorded frame is arranged in the detection beam path, or in the detection beam path and the illumination beam path.

3. The microscope of claim 1, wherein the at least one filter wheel is arranged in a pupil plane of the beam path.

4. The microscope of claim 1 wherein at least part of the filters are designed to cover two or more segments of the first part of segments.

5. The microscope of claim 1 wherein the filters are monolithic layers applied on a substrate.

6. The microscope of claim 1, wherein the means for deflecting light comprise at least one mirror, arranged so as to be displaceable along the beam path, for the deflection of light reflected by one or several of the filters, onto at least one more filter in the filter wheel.

7. The microscope of claim 1, wherein the means for deflecting light comprise a number of closable diaphragms, corresponding at least to the number of divided circles, arranged in front of or behind the filters for suppressing unwanted light.

8. The microscope of claim 1, wherein the filter wheel device comprises at least one more mirror, preferably arranged so as to be displaceable along the beam path, that is arranged in the beam path behind the at least one filter wheel and is designed to reflect the light onto another camera with a planar detector.

9. The microscope of claim 1, wherein the means for deflection comprise a reflection prism that can be introduced into the beam path for displacing the incident beam before it hits the filter wheel, and/or are designed to completely reflect those areas of the segments of the first part of segments that are not covered by the filters.

10. The microscope of claim 1, wherein the means for deflecting light comprise a fully mirror-coated wheel rigidly connected to the shaft and positioned at a specified distance to the at least one filter wheel, and wherein the mirror-coated wheel and the filter wheel can be displaced together on the shaft between specified positions.

11. The microscope of claim 1 wherein one segment each of a second part of segments is arranged between the segments of the first part, the segments of the second part being designed to be reflective.

12. The microscope of claim 11, wherein the filter wheel device comprises a light-sensitive detector coupled to the control system, for the detection of light reflected by all filters of the filter wheel that are in the beam path at a time, and wherein the control system uses variations in intensity for controlling the rotational frequency or the frame rate.

13. The microscope of claim 1, wherein the filter wheel device is provided with means for coupling illuminating light.

14. The microscope of claim 1, wherein the filter wheel device comprises at least one second filter wheel, with the at least one second filter wheel being rotatable against the first filter wheel or against the sense of rotation of the shaft, for aligning the filters of the filter wheels with each other.

15. The microscope of claim 1, wherein the filters are inserted in suitable openings of the filter wheel.

16. The microscope of claim 1, wherein the shaft has at least one click-in position for receiving the filter wheel.

17. The microscope of claim 1, wherein the filter wheel is displaceable between different click-in positions on the shaft.

18. The microscope of claim 1, wherein the shaft is mounted so as to be displaceable normal to its axis of rotation.

19. A microscope for widefield microscopy with a detection beam path and an illumination beam path, comprising:
a filter wheel device including a filter wheel mounted on a motor-driven shaft so as to be rotatable about an axis at a specified rotational frequency, the shaft having at least one click-in position for receiving the filter wheel with the filter wheel being displaceable between different click-in positions on the shaft, the filter wheel arranged in the detection beam path, or in the detection beam path and the illumination beam path, the filter wheel being divided into a plurality of segments, a first plurality of filters forming a first divided circle being arranged in at least a first part of the segments, so that each filter in the first plurality of filters is successively introduced into the detection beam path or the illumination beam path when the filter wheel is rotated, and a second plurality of filters forming at least one more divided circle, arranged in at least the first part of the segments, so that the segments of the first part contain at least two filters arranged in succession in a radial direction, the filter wheel device further comprising a light deflecting element arranged to deflect light reflected by a first filter in a segment of the first part of segments onto a second filter in the same segment;
a camera with a planar detector in the detection beam path, designed to record images at a specified frame rate; and
a control system for synchronizing the frame rate and the rotational frequency depending on the filters arranged on the filter wheel.

* * * * *

UNITED STATES PATENT AND TRADEMARK OFFICE
CERTIFICATE OF CORRECTION

PATENT NO. : 9,435,992 B2
APPLICATION NO. : 14/344704
DATED : September 6, 2016
INVENTOR(S) : Ingo Kleppe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this
Twenty-eighth Day of August, 2018

Andrei Iancu
*Director of the United States Patent and Trademark Office*